2,765,252

SYNERGISTIC BIS-(DIMETHYLAMINO)-FLUOROPHOSPHINE OXIDE INSECTICIDAL COMPOSITIONS

Max Pianka, Wheathampstead, England, assignor to The Murphy Chemical Company Limited, Wheathampstead, England, a British company No Drawing. Application July 9, 1953,
Serial No. 367,097

Claims priority, application Great Britain July 11, 1952

5 Claims. (Cl. 167—22)

This invention relates to the manufacture of insecticidal compositions containing organic phosphorus compounds and of phosphorus compounds for inclusion therein and is an improvement in or modification and further development of the invention of Specification Serial No. 292,979.

Specification Serial No. 292,979 describes and claims inter alia an insecticidal composition comprising a bis-(bis-dialkylamino)-phosphonous anhydride together with an added proportion of a compatible amide or ester or mixed amide ester of ortho-phosphoric acid.

The invention of the said prior specification is based on the observation that the specified added compounds have an activating effect upon bis-(bis-dialkylamino)-phosphonous anhydrides (e. g. bis-(bis-dimethylamino)-phosphonous anhydride or schradan).

The present invention is based on the further observation that the same compounds also have an activating effect upon another known systemic insecticide, namely bisdimethylaminofluorophosphine oxide (B. F. P. O.) of the formula

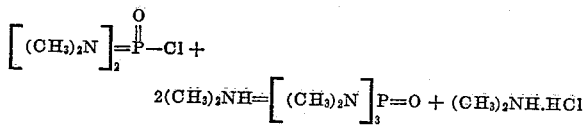

A systemic insecticide has the property of being taken up into the system of a plant and is translocated to various parts of the plant thereby killing insects which suck sap of the treated plant.

As stated in Specification Serial No. 292,979 the specified amides, esters and mixed amide esters have the following constitution:

(i)                  $(R_2N)_3 \equiv P=O$ (ii)                $(RO)_3 \equiv P=O$ (iii)              $(R_2N)_2=P-OR$
                                $\parallel$
                                $O$ (iv)               $R_2N-P=(OR)_2$
                                $\parallel$
                                $O$ wherein the symbols R represent alkyl, aryl or aralkyl residues which may be identical or different in the same compound, or hydrogen atoms except when R is linked to oxygen.

According to one feature of the present invention insecticidal compositions are manufactured by effecting admixture of B. F. P. O. with an activator of the nature specified. The activator must in this case be compatible with B. F. P. O. By compatible is meant that the added compound is soluble or dispersible in water without producing such a concentration of acid as to cause rapid decomposition of the said B. F. P. O.

For application as insecticides the said compositions may be formulated by adding compatible diluents, emulsifiers and/or wetting agents as required. In this case compatible has the same meaning as above with the addition that the added agent must not deactivate the mixture.

The admixture of the B. F. P. O. with the activator may take place in any convenient manner depending on the nature of the activator and is not limited to mere mixing of the separately produced substances. Thus in the case of the application of trisdimethylaminophosphine oxide (also referred to below as "tris") as activator the desired mixed product may be produced in situ by adding a higher proportion of dimethylamine during the process of formation of bisdimethylaminochlorophosphine oxide according to the following equation:

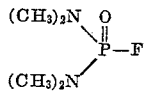 $=\overset{O}{\underset{\parallel}{P}}-Cl +$ $2(CH_3)_2NH = \left[(CH_3)_2N\right]_3 P=O + (CH_3)_2NH.HCl$ The proportion of tris to bisdimethylaminochlorophosphine oxide can be varied at will depending on the excess of dimethylamine used. Thus if the proportion of dimethylamine is 8% over and above that required for the formation of bisdimethylaminochlorophosphine oxide from phosphorus oxychloride and dimethylamine according to the equation:

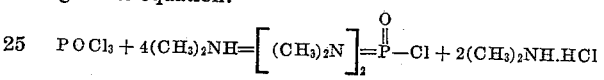

16% of trisdimethylaminophosphine oxide and 84% bisdimethylaminochlorophosphine oxide are formed (occasionally a proportion of dimethylaminodichlorophosphine oxide and a higher proportion of trisdimethylaminophosphine oxide are present probably due to inefficient mixing). When the above mixture is reacted in chloroform with aqueous potassium fluoride (see below) only bisdimethylaminochlorophosphine oxide reacts to give a 73% yield of B. F. P. O. achieving the desired proportion of 22% tris to 78% B. F. P. O.

The following examples illustrate this feature of the invention:

EXAMPLE 1

Triethyl phosphate was mixed in the proportion by weight of 22% to 78% of B. F. P. O. The biological activity of the mixture was estimated as follows:

French bean plants infested with adults of greenhouse red spider (*tetranychus telarius*) were grown in aqueous culture solutions to which had been added appropriate quantities of the mixture. The mortalities of the red spider were observed after 48 hours and compared with those given by B. F. P. O. as the standard. An activity of 186% was obtained as compared with B. F. P. O. as 100%. Therefore in this instance the triethyl phosphate multiplies the activity of B. F. P. O. by a factor of $$\frac{186}{78} = \text{ca. } 2.4$$

EXAMPLE 2

French bean plants were placed in culture solutions containing either (a) Appropriate concentrations of a mixture of B. F. P. O. and triethyl phosphate in the proportions by weight of 2 parts of B. F. P. O. to 1 part of triethyl phosphate, or (b) The same concentrations of B. F. P. O. alone.

The plants were infested with adults of greenhouse red spider (*Tetranychus telarius*). The mortalities of the adults were observed after a period of 48 hours and the concentrations of the mixture of B. F. P. O. and triethyl phosphate required to give a kill of 95 per cent of the adult population (LD 95) were compared with the concentrations of B. F. P. O. required to give an LD 95. An activation factor of about 3 was observed. On other occasions using the above technique, but a different method of assessment of insecticidal activities whereby the percentage mortalities were compared at certain concentrations of B. F. P. O. alone or to which triethyl phosphate has been added in the proportion stated above, an activation factor of 2-3 was obtained.

EXAMPLE 3

Broad beans growing in soil compost of standard composition, and based on a composition known in horticulture as John Innes compost No. 1, were infested with *Aphis fabae* and watered with (a) Appropriate concentrations of a mixture of B. F. P. O. and triethyl phosphate in the proportions of 2 parts of B. F. P. O. to 1 part of triethyl phosphate by weight.
(b) The same concentrations of B. F. P. O. alone.

Care was taken so as to avoid wetting the plants during the watering of the soil with the insecticidal mixtures.

Observations of the aphid populations were carried out over a period varying from 3 to 13 days and assessed by the method described by W. A. L. David and B. O. C. Gardiner in the Annals of Applied Biology, 1951, vol. 38, No. 1, p. 91.

The experiments were carried out in the growing season during which systemic insecticides, which are absorbed by the plant and translocated within it, are normally applied. In the table below, material A is an aqueous solution of B. F. P. O. alone, material B an aqueous solution of B. F. P. O. and an added proportion of triethyl phosphate in the ratio of 2 parts of B. F. P. O. to 1 part of triethyl phosphate by weight; N denotes a normal population, i. e. thriving colonies with aphids of all stages settled and feeding, or a few adults surrounded by young; D denotes a declining population, i. e. colonies with few young aphids, some dead aphids on and around the plant, and the remaining aphids often moving restlessly about the plant; S denotes single individuals, i. e. only scattered individual aphids and no young on the plant and around the plant dead aphids. Nil denotes no aphids on the plant. A set of three experiments was carried out in which the first was observed for 3 days only, the second for 6 days and the last for 13 days.

*Table*

| Material | Concentration B.F.P.O. (percent) | Third day | | | | Sixth day | | | | Tenth day | | | | Thirteenth day | | | |
|---|---|---|---|---|---|---|---|---|---|---|---|---|---|---|---|---|---|
| | | N | D | S | Nil | N | D | S | Nil | N | D | S | Nil | N | D | S | Nil |
| A | 0.05 | | 2 | 1 | 1 | | | | | | | | | | | | |
| | 0.025 | | 1 | 2 | 1 | | | | | | | | | | | | |
| B | 0.05 | | | | 4 | | | | | | | | | | | | |
| | 0.025 | | | 1 | 3 | | | | | | | | | | | | |
| A | 0.05 | | 1 | 1 | 1 | 3 | | | | | | | | | | | |
| | 0.025 | | 1 | 2 | | 3 | | | | | | | | | | | |
| B | 0.05 | | | | 3 | | | 1 | | | | 2 | | | | | |
| | 0.025 | | | 2 | 1 | 3 | | | 1 | 2 | | | 1 | 3 | | | |
| A | 0.1 | | 1 | | 2 | | 2 | | 1 | 2 | 1 | | | 3 | | | |
| | 0.05 | | 1 | 1 | 1 | | 1 | 2 | | 2 | | 2 | | 2 | | | 1 |
| B | 0.1 | | | | 3 | | | 2 | 1 | 1 | | 1 | | 2 | | | |
| | 0.05 | | | | 3 | | 1 | 1 | 1 | 1 | | 1 | 1 | 2 | | 1 | |

These experiments demonstrate that the addition of triethyl phosphate enhances the insecticidal efficiency of B. F. P. O. since material B is a more effective insecticide than A.

EXAMPLE 4

4 year old tangerine plants growing in soil compost of standard composition were watered with (a) Appropriate concentrations of a mixture of B. F. P. O. and triethyl phosphate in the proportions of 3 parts of B. F. P. O. to 1 part of triethyl phosphate by weight
(b) The same concentrations of B. F. P. O. alone.

Care was taken so as to avoid wetting the plants during the watering of the soil with the insecticidal mixtures. The plants were then infested with mealy bugs (*Pseudococcus citri*). The mortalities of the adults were observed after 4 days. The plants were re-infested with mealy bugs at 5 day intervals and the mortalities of the adults observed 4 days after each re-infestation. An activation factor of about 2 was obtained. Activation persisted for not less than three weeks.

EXAMPLE 5

Trimethyl phosphate, when mixed with B. F. P. O. in the same proportion as in Example 1 and tested in the same way, gave an activity of 100% that is an activation factor of $$\frac{100}{78} = \text{ca. } 1.3$$

EXAMPLE 6

Trisdimethylaminophosphine oxide (known as tris) in the same circumstances as in Example 1 gave an activity of 93% that is an activation factor of $$\frac{93}{78} = \text{ca. } 1.2$$

EXAMPLE 7

2 year old cocoa trees growing in soil compost and infested with mealy bugs (*Pseudococcus citri*) were watered with either (a) Appropriate concentrations of a mixture of B. F. P. O. and trisdimethylaminophosphine oxide in the proportions by weight of 3 parts of B. F. P. O. to 1 part of tris, or
(b) The same concentrations of B. F. P. O. alone.

On using the same technique as in Example 4, an activation of not less than 2 was observed. Activation persisted for not less than seven weeks.

EXAMPLE 8

Diethoxydimethylaminophosphine oxide was mixed in the proportion by weight of 22% to 78% of B. F. P. O. Using the method described in Example 1, an activation factor of 1.3 was obtained.

EXAMPLE 9

Bisdimethylaminoethoxyphosphine oxide was mixed in the proportion by weight of 22% to 78% of B. F. P. O. Using the method described in Example 1, an activation factor of 1.4 was obtained.

A further feature of the present invention relates to an improved method of manufacture of B. F. P. O. This compound is mentioned in BIOS Final Report No. 714. On page 41 of this report a method is given for its preparation, as follows:

85 grams of bisdimethylaminochlorophosphine oxide are added while stirring to a solution of 105 grams of potassium fluoride in 90 cc. water. The temperature rises to about 75° C. After completion of the addition, the mixture is left standing for 30 minutes at about 80°

C., and then allowed to cool off. About 90 cc. water are added and the product is extracted with ether. After fractionation, 37 grams (48% of theory) of B. F. P. O. are obtained.

According to the present invention the reaction between bisdimethylaminochlorophosphine oxide and an aqueous solution of an alkali fluoride which is soluble in water without giving rise to acid, such as potassium fluoride or ammonium fluoride (not ammonium bifluoride), is carried out in the presence of an inert water-immiscible solvent for B. F. P. O. This solvent acts as a solvent of extraction which removes the product from the immediate reaction zone and therefore promotes its formation. Toluene is a suitable solvent of this nature.

The following examples illustrate this feature of the invention, the parts being by weight:

EXAMPLE 10

A solution of 49.5 parts of anhydrous dimethylamine in 154 parts of toluene was added, while stirring, to 42.2 parts of phosphorus oxychloride dissolved in 158 parts of toluene, during 2 hours at a temperature of 20–23° C. The precipitated dimethylamine hydrochloride was filtered off and washed well with toluene. The yield of bisdimethylaminochlorophosphine oxide in the filtered toluene solution as estimated by titration was 90 per cent. and represented a 9.5% w./w. solution of bisdimethylaminochlorophosphine oxide in toluene. This solution contained 42.3 parts of bisdimethylaminochlorophosphine oxide. This solution was added to a solution of 52.5 parts of potassium fluoride in 45 parts of water in a vessel fitted with a stirrer, dropping funnel and thermometer; vigorous stirring was found essential throughout the reaction. The addition lasted 20 minutes. The temperature of the reaction mixture was kept for 1 hour at 80–85° C. The toluene then did not contain any chloro-compound. The reaction mixture was cooled to room temperature. 50 parts of water were added to dissolve the precipitated potassium chloride. The toluene layer was separated from the aqueous layer and the toluene distilled under reduced pressure. The yield of the product was 30.5 parts representing a yield of 80 per cent. of theory. On distillation under reduced pressure 29 parts came over at 86–90° C. under 10 mm. pressure. The overall yield of B. F. P. O. on dimethylamine was therefore 68 per cent of theory.

EXAMPLE 11

To 80 g. of ammonium fluoride in 90 g. water 42.3 g. of bisdimethylaminochlorophosphine oxide dissolved in 372 g. of toluene were added with rapid stirring during 40 minutes at room temperature. The temperature was then raised to 80° C. and kept between 80–86° C. for 5½ hours, at the end of which the toluene layer was free of any chloro-compound. The toluene layer was separated and the toluene stripped off, under reduced pressure of 40 mm. and temperature rising to 100° C. B. F. P. O. was obtained in a yield of 40 per cent of theory.

EXAMPLE 12

A solution of 10.7 parts of bisdimethylaminochlorophosphine oxide in 59.5 parts of chlorobenzene was added quickly to a solution of 5.3 parts of potassium fluoride in 4.6 parts of water at room temperature. The mixture was then stirred rapidly and kept at 85–95° C. for 3 hours after which period no bisdimethylaminochlorophosphine oxide could be detected in the organic layer. The chlorobenzene layer was separated, the solvent stripped under reduced pressure of 40 mm. and at a temperature rising to 100° C. The weight of the residual oil was 7.5 parts. This oil was distilled at 95–98° C. and 22 mm. Hg and gave 70 per cent of theory of bisdimethylaminofluorophosphine oxide.

EXAMPLE 13

A solution of 10.7 parts of bisdimethylaminochlorophosphine oxide in 80 parts of chloroform was added quickly to a solution of 5.3 parts of potassium fluoride in 4.6 parts of water at room temperature. The mixture was then stirred vigorously and warmed to a temperature of 61° C. at which it was kept for 4½ hours. After this period the organic layer contained no bisdimethylaminochlorophosphine oxide. The chloroform layer was separated and the chloroform stripped. The residue consisted of 6.8 parts of an oil which proved by distillation to be pure B. F. P. O. Yield of pure B. F. P. O. was therefore 73 per cent of theory.

EXAMPLE 14

A solution of 10.7 parts of bisdimethylaminochlorophosphine oxide in 47 parts of benzene was added at room temperature to a solution of 5.3 parts of potassium fluoride in 4.6 parts of water. The mixture was then kept at 80° C. with efficient stirring during 4½ hours. After this time there was no chloride in the benzene layer, which was then separated, and the benzene was stripped off. The residual oil (B. F. P. O.) was present in a yield of 61 per cent of theory.

In all of Examples 10–14 the residual oil remaining after the stripping of the organic solvent did not contain any chlorocompound (which hydrolyses in water to give acid). It was neutral in water which is an advantage since B. F. P. O. is not very stable to acid. Since the residual oil is neutral, as it contains no bisdimethylaminochlorophosphine oxide, there is no need to isolate B. F. P. O. from it or neutralise the acidity, and it can be stored without decomposition.

The term "compatible" used in the following claims has the meaning hereinbefore set forth.

I claim:

1. An insecticidal composition containing bisdimethylaminofluorophosphine oxide and as a synergist a water-soluble, compatible member of the group consisting of the compounds of the following general formulae:

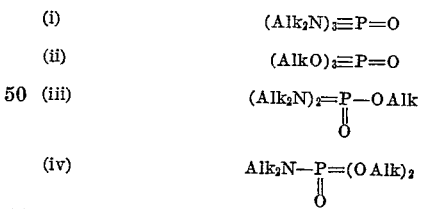

wherein the symbols Alk represent alkyl groups which may be different in the same compound, bisdimethylaminofluorophosphine oxide and the synergist being present in the relative proportion of about 78:22 per cent by weight to about 66⅔:33⅓ per cent by weight.

2. An insecticidal composition consisting of about 78 per cent by weight of bisdimethylaminofluorophosphine oxide and about 22 per cent by weight of trisdimethylaminophosphine oxide.

3. An insecticidal composition consisting of about 78 per cent by weight of bisdimethylaminofluorophosphine oxide and about 22 per cent by weight of a member of the group consisting of trimethyl and triethyl phosphates.

4. An insecticidal composition consisting of about 78 per cent by weight of bisdimethylaminofluorophosphine oxide and about 22 per cent by weight of a member of the group consisting of bisdimethylaminoethoxyphosphine oxide and diethoxydimethylaminophosphine oxide.

5. An insecticidal composition consisting of about 2 parts by weight of bisdimethylaminofluorophosphine oxide and about 1 part by weight of triethyl phosphate.

References Cited in the file of this patent

Ludvik et al.: Journ. Econ. Entomology, vol. 44, pp. 405 to 418, June 1951.

Soap and Sanitary Chems., vol. 27, No. 1, January 1951, p. 109.

Science News Letter, vol. 60, No. 6, p. 85, August 11, 1951.

Schrader: BIOS Final Report 1808, p. 15.